(12) United States Patent
Miyao et al.

(10) Patent No.: US 10,345,597 B2
(45) Date of Patent: Jul. 9, 2019

(54) PRODUCTION METHOD FOR A BONDED OPTICAL MEMBER AND A VIRTUAL IMAGE DISPLAY DEVICE

(71) Applicant: SEIKO EPSON CORPORATION, Tokyo (JP)

(72) Inventors: Toshiaki Miyao, Matsumoto (JP); Masayuki Takagi, Matsumoto (JP); Takashi Takeda, Suwa (JP); Akira Komatsu, Tatsuno-machi (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 15/909,342

(22) Filed: Mar. 1, 2018

(65) Prior Publication Data

US 2018/0267311 A1 Sep. 20, 2018

(30) Foreign Application Priority Data

Mar. 15, 2017 (JP) .................. 2017-049701

(51) Int. Cl.
| | |
|---|---|
| *G02B 27/01* | (2006.01) |
| *G02B 27/00* | (2006.01) |
| *G02B 1/14* | (2015.01) |
| *F21V 8/00* | (2006.01) |

(52) U.S. Cl.
CPC .......... *G02B 27/0172* (2013.01); *G02B 1/14* (2015.01); *G02B 6/0048* (2013.01); *G02B 27/0006* (2013.01); *G02B 6/002* (2013.01); *G02B 6/0038* (2013.01); *G02B 2027/0125* (2013.01); *G02B 2027/0174* (2013.01); *G02B 2027/0178* (2013.01)

(58) Field of Classification Search
CPC ............ G02B 27/0006; G02B 27/0172; G02B 6/0048; G02B 1/14; G02B 2027/0174
See application file for complete search history.

(56) References Cited

U.S. PATENT DOCUMENTS

| | | | | | |
|---|---|---|---|---|---|
| 4,226,657 | A | * | 10/1980 | Cottingham | ............ B32B 15/08 156/196 |
| 5,054,683 | A | * | 10/1991 | Haisma | ............... H01L 21/2007 148/DIG. 133 |
| 5,840,407 | A | * | 11/1998 | Futhey | .................... B44F 1/063 428/167 |
| 6,180,245 | B1 | * | 1/2001 | Janssen | .................. B29C 73/04 428/142 |

(Continued)

FOREIGN PATENT DOCUMENTS

| | | | | |
|---|---|---|---|---|
| EP | 162633 A | * | 11/1985 | ............... G11B 7/26 |
| JP | 2013-061594 A | | 4/2013 | |

(Continued)

*Primary Examiner* — Daniel Petkovsek
(74) *Attorney, Agent, or Firm* — Oliff PLC

(57) ABSTRACT

By forming a hard coat layer on a bonding surface which is a surface of a bonding region between a first base material and a second base material, smoothing is achieved, and as a smoothing assisting treatment before forming the hard coat layer, the surfaces of the base materials are flattened by polishing on the bonding surface or a region corresponding to the bonding surface. By the synergistic effect of smoothing by formation of the hard coat layer and a flattening treatment by polishing as the smoothing assisting treatment, sufficient smoothing is achieved.

13 Claims, 9 Drawing Sheets

(56) References Cited

U.S. PATENT DOCUMENTS

| | | | |
|---|---|---|---|
| 6,995,893 B2* | 2/2006 | Kobayashi | H01L 51/524 257/433 |
| 7,826,113 B2 | 11/2010 | Noda | |
| 8,657,992 B2* | 2/2014 | Schaper | G02F 1/1303 156/295 |
| 9,632,310 B2 | 4/2017 | Takagi et al. | |
| 2010/0272964 A1* | 10/2010 | Traggis | C03C 27/00 428/172 |
| 2013/0160938 A1* | 6/2013 | Yasui | G02B 5/3025 156/246 |
| 2013/0278631 A1* | 10/2013 | Border | G02B 27/017 345/633 |
| 2015/0185480 A1* | 7/2015 | Ouderkirk | G02B 27/0172 359/489.19 |
| 2018/0031840 A1* | 2/2018 | Hofmann | G02B 5/18 |

FOREIGN PATENT DOCUMENTS

| | | |
|---|---|---|
| JP | 5256488 B2 | 8/2013 |
| JP | 2015-121646 A | 7/2015 |
| JP | 2015-121647 A | 7/2015 |
| JP | 2016-057381 A | 4/2016 |

* cited by examiner

PRODUCTION METHOD FOR A BONDED OPTICAL MEMBER AND A VIRTUAL IMAGE DISPLAY DEVICE

BACKGROUND

1. Technical Field

The present invention relates to a production method for a bonded optical member which can be utilized as a light guiding device that presents a video formed by, for example, a video element or the like to an observer, a production method for a virtual image display device, a light guiding device, and a virtual image display device.

2. Related Art

There has been known a bonded optical member in which two optical members are bonded with an adhesive as a bonded optical member which can be applied to, for example, a virtual image display device such as a head-mounted display (hereinafter also referred to as "HMD") to be worn on the head of an observer (see, for example, Japanese Patent No. 5256488 (Patent Document 1)).

In Patent Document 1, as a method for removing an adhesive protruding from a bonding face when bonding two optical members by wiping off, a surface coat layer is formed on each of the optical members before bonding with the adhesive, and the adhesive protruding on the surface coat layer from the bonding face when bonding is removed by wiping off after curing the adhesive to some extent. It is said that by doing this, as compared with, for example, a case where the adhesive in an uncured state is wiped off, the formation of a concavely recessed region due to excessive removal of the adhesive is avoided, and the deterioration of the optical performance is prevented.

However, for example, in a case where the surface coat layer is formed before bonding, and thereafter, the adhesive is applied, even if the formation of a concavely recessed region can be avoided, it is not necessarily the case that a favorable state where the surface between the two optical members and the bonding region where the adhesive is applied is sufficiently smoothed can be ensured, and a favorable see-through property may be disturbed.

SUMMARY

An advantage of some aspects of the invention is to provide a production method for a bonded optical member capable of simply and reliably forming the surface of a bonding region in a favorable state when producing the bonded optical member by bonding two base materials, a production method for a virtual image display device including a bonded optical member as a light guiding device, a light guiding device, and a virtual image display device.

A production method for a bonded optical member according to an aspect of the invention is a production method for a bonded optical member in which a first base material and a second base material are bonded, and includes bonding the first base material and the second base material while positioning a surface of the first base material and a surface of the second base material, forming a smoothing film-formed face by performing film formation on a bonding surface of a bonding section formed between the surface of the first base material and the surface of the second base material in the bonding, also on at least the surfaces of adjacent regions in the bonding of the surfaces of the first base material and the second base material to smooth the surfaces, and performing a smoothing assisting treatment on the bonding surface or a region corresponding to the bonding surface.

In the production method for a bonded optical member, smoothing is achieved by forming the smoothing film-formed face on the bonding surface which is the surface of the bonding region between the first base material and the second base material also on at least the surfaces of adjacent regions in the bonding of the surfaces of the first base material and the second base material, and at this time, the smoothing assisting treatment on the bonding surface or a region corresponding to the bonding surface is performed. According to this configuration, sufficient smoothing can be achieved by the synergistic effect of smoothing by the smoothing film-formed face and the smoothing assisting treatment, and the bonded optical member in which the surface of the bonding region is simply and reliably formed in a favorable state can be produced.

In a specific aspect of the invention, the smoothing film-formed face is a face formed by a dip treatment. In this case, the smoothing film-formed face can be formed to a desired film thickness by a dip treatment.

In another aspect of the invention, the smoothing film-formed face is formed of a hard coat layer. In this case, a scratch on an exposed portion can be suppressed.

In still another aspect of the invention, the smoothing assisting treatment is a treatment of forming an assisting film-formed face by further performing film formation on the smoothing film-formed face after forming the smoothing film-formed face. In this case, by forming the assisting film-formed face, sufficient smoothing can be achieved by the synergistic effect of smoothing by the smoothing film-formed face.

In still another aspect of the invention, the assisting film-formed face includes a face formed by a dip treatment. In this case, the assisting film-formed face can be formed to a desired film thickness by a dip treatment.

In still another aspect of the invention, the assisting film-formed face has a multilayer film structure in which a layer having a relatively high refractive index and a layer having a relatively low refractive index are alternately stacked. In this case, for example, the assisting film-formed face can be made to function as an antireflective film (AR coat).

In still another aspect of the invention, the smoothing assisting treatment is a treatment of flattening a surface portion including at least a region to become the bonding surface before forming the smoothing film-formed face. In this case, by performing the flattening treatment in advance, sufficient smoothing can be achieved by forming the smoothing film-formed face.

In still another aspect of the invention, the smoothing assisting treatment is a flattening treatment by polishing using an abrasive grain or a blade-shaped member. In this case, flattening can be performed by polishing.

In still another aspect of the invention, the smoothing film-formed face is formed by filling a processing mark by polishing. In this case, sufficient smoothing is achieved by filling a processing mark.

In still another aspect of the invention, the first base material constitutes a light guiding member which guides a video light, the second base material constitutes a light transmitting member which is provided so as to face the light guiding member and transmits an external light therethrough, and a reflective face which reflects a video light is formed on the bonding face between the first base material and the second base material. In this case, by the light guiding member and the light transmitting member, a see-through optical system can be constituted.

A production method for a virtual image display device according to an aspect of the invention produces a virtual image display device which includes a bonded optical member produced by the production method for a bonded optical member according to any of the aspects of the invention as a light guiding device. In this case, by including the bonded optical member as a light guiding device, the bonding region can be brought into a favorable state, and therefore, for example, a virtual image display device in a favorable see-through state can be produced.

A first light guiding device according to an aspect of the invention includes a polished face flattened by polishing a bonding surface of a bonding section formed between a first base material and a second base material, and a smoothing film-formed face formed by performing film formation while smoothing the polished face.

In the above light guiding device, a bonding surface of a bonding section formed between a first base material and a second base material is flattened by polishing, and the polished face which is the flattened face is smoothed by the smoothing film-formed face, whereby a region from the surface of the first base material to the surface of the second base material including the bonding surface therebetween is smoothed and therefore can be simply and reliably brought into a favorable state.

A second light guiding device according to an aspect of the invention includes a first film-formed face as a smoothing film-formed face formed by performing film formation while smoothing on a bonding surface of a bonding section formed between a surface of a first base material and a surface of a second base material, and a second film-formed face as an assisting film-formed face which is formed by performing film formation on the first film-formed face so as to assist smoothing.

In the above light guiding device, the surface of the first base material and the surface of the second base material, and the bonding surface of the bonding section formed therebetween can be smoothed in cooperation of the first film-formed face with the second film-formed face.

A virtual image display device according to an aspect of the invention includes the light guiding device according to any of the aspects of the invention. In this case, the bonding region of the light guiding device can be brought into a favorable state, and therefore, for example, it can be brought into a favorable see-through state.

BRIEF DESCRIPTION OF THE DRAWINGS

The invention will be described with reference to the accompanying drawings, wherein like numbers reference like elements.

DESCRIPTION OF EXEMPLARY EMBODIMENTS

First Embodiment

Hereinafter, with reference to FIG. 1 or the like, a virtual image display device including a light guiding device as a bonded optical member according to a first embodiment of the invention will be described in detail including a production method for the bonded optical member.

Figure 1:
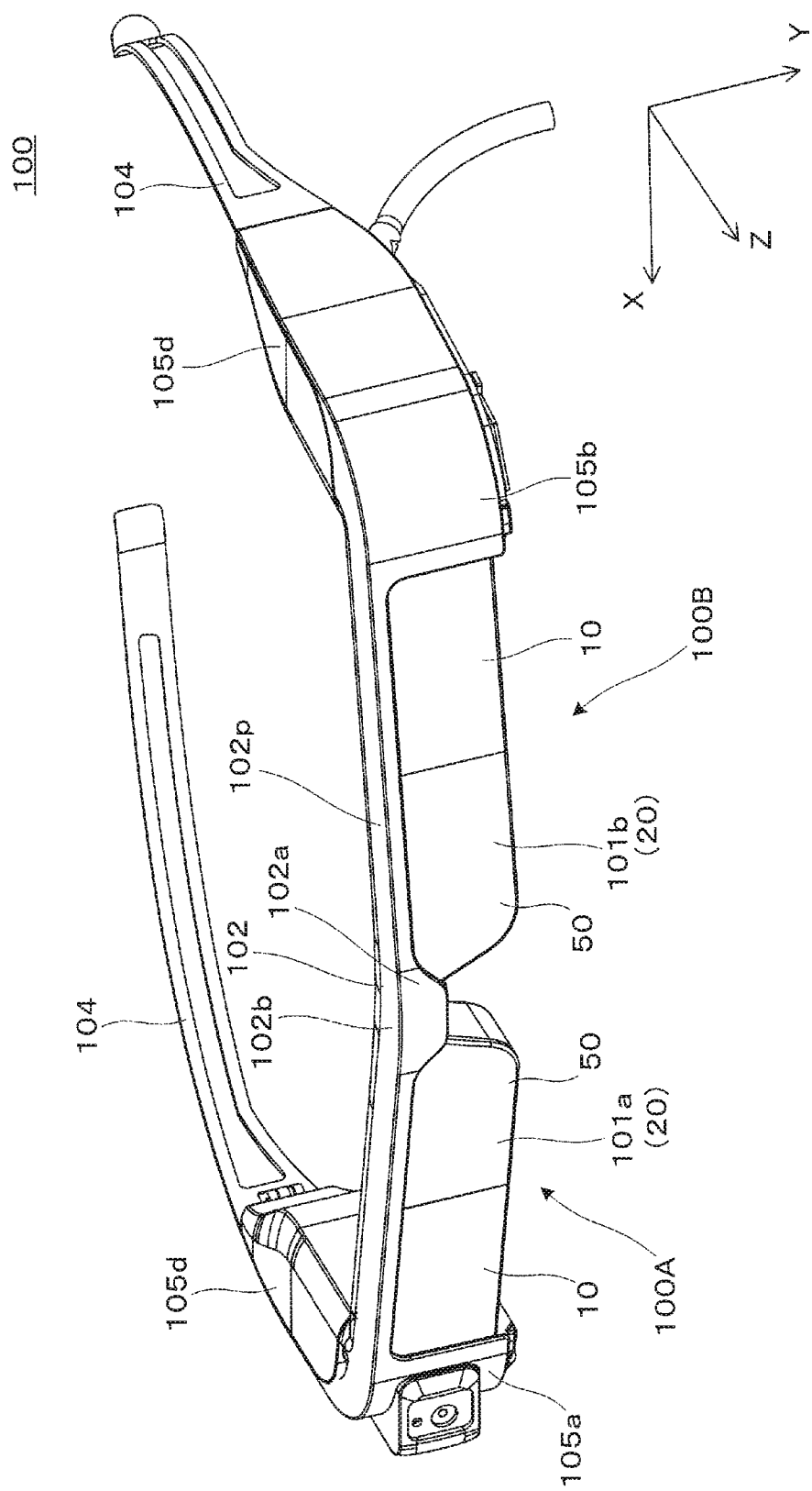
FIG. 1 is a perspective view for illustrating the external appearance of an example of a virtual image display device including a light guiding device as a bonded optical member according to a first embodiment.
Figure 2:
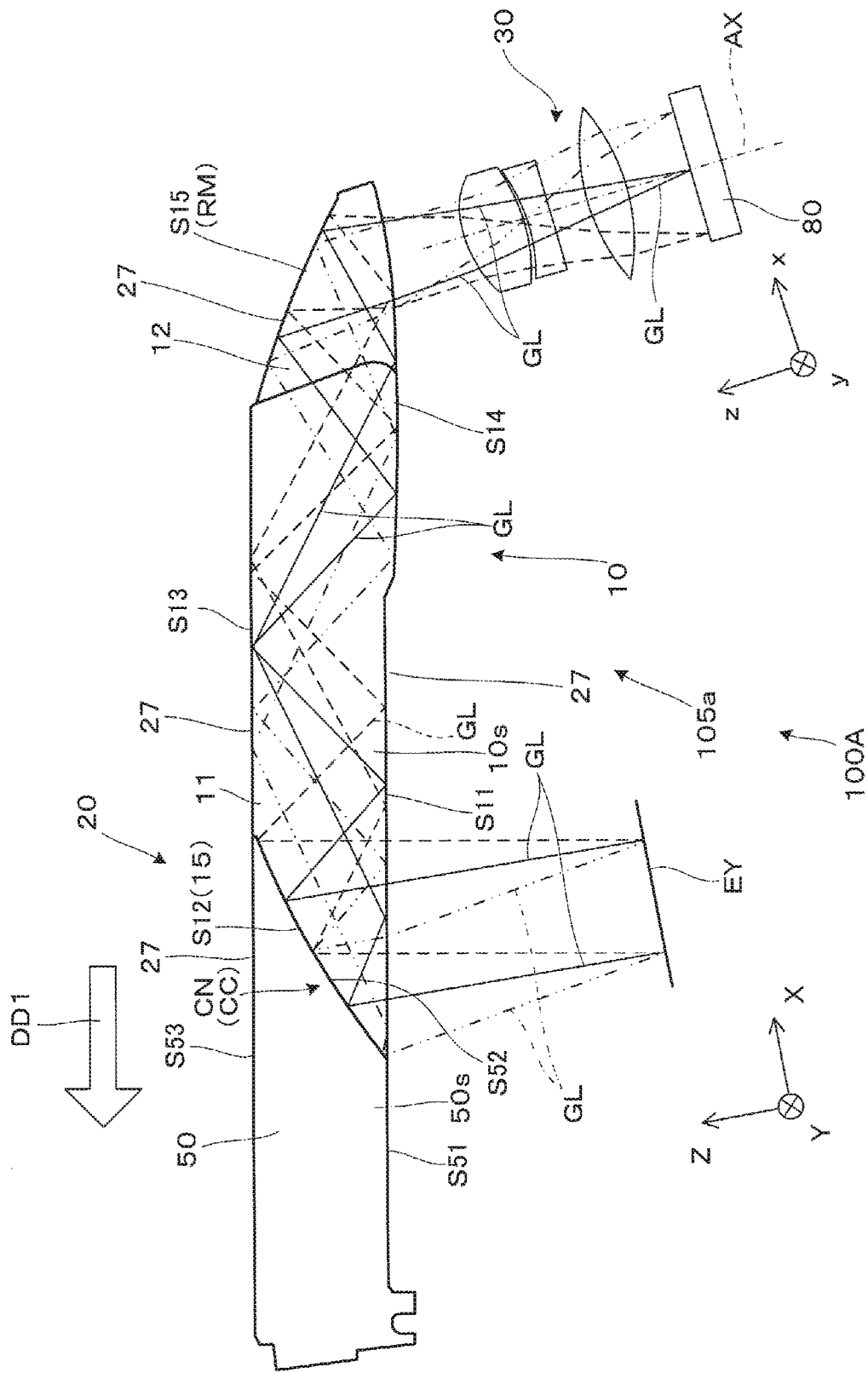
FIG. 2 is a view for conceptually illustrating an optical path of a video light in the virtual image display device.

As shown in FIGS. 1 and 2, a virtual image display device 100 according to this embodiment is a head-mounted display (HMD) with an external appearance like eyeglasses, and is capable of allowing an observer or a user who wears this virtual image display device 100 to visually recognize an image light (a video light) based on a virtual image, and also is capable of allowing the observer to visually recognize or observe an external image in a see-through manner. The virtual image display device 100 includes a first display device 100A, a second display device 100B, and a frame section 102. In particular, in this embodiment, in the respective display devices 100A and 100B, light guiding members 10 and 10 each guiding a video light are included, respectively.

The first display device 100A and the second display device 100B are portions forming virtual images for the right eye and the left eye, respectively, and include first and second optical members 101a and 101b covering the eyes of the observer so as to be able to see therethrough, and first and second image forming body sections 105a and 105b, respectively. The first and second image forming body sections 105a and 105b will be described later, but each is constituted by a display device (video element), an optical system for forming an image such as a projection lens, a member for housing such an optical system, etc. The display device (video element), the projection lens, etc. are supported and housed by being covered with a cover-like exterior member (case member) 105d. As previously described, a part of each light guiding member 10 is also covered. The first and second optical members 101a and 101b are each a light guiding section, which guides a video light formed by each of the first and second image forming body sections 105a and 105b and also allows an external light and the video light to be visually recognized in an overlapped manner, and constitute a light guiding device including a light guiding member. Hereinafter, the first optical member 101a or the second optical member 101b is also referred to as "light guiding device 20". Each of the first display device 100A and the second display device 100B functions as a virtual image display device even alone.

The frame section 102 is an elongated member bent in a U-shape in a plan view, and is an integral part made of a metal. Here, as one example, the frame section 102 is constituted by using a magnesium frame (magnesium alloy) which is an integral part made of a metal as a body portion 102p. Further, as shown in the drawing, the frame section 102 includes a central section 102a which has a thick-wall structure and is provided so as to be connected to both the first optical member 101a and the second optical member 101b (the light guiding device 20 which is a pair of light guiding sections), and a support body 102b which extends along the first and second optical members 101a and 101b from the central section 102a and further forms a region bent in a U-shape.

A temple 104 which is a sidepiece portion extending backward from both right and left ends of the frame section 102 is provided and can be used as a support member by being brought into contact with the ears, temples, etc. of the observer.

Figure 3:
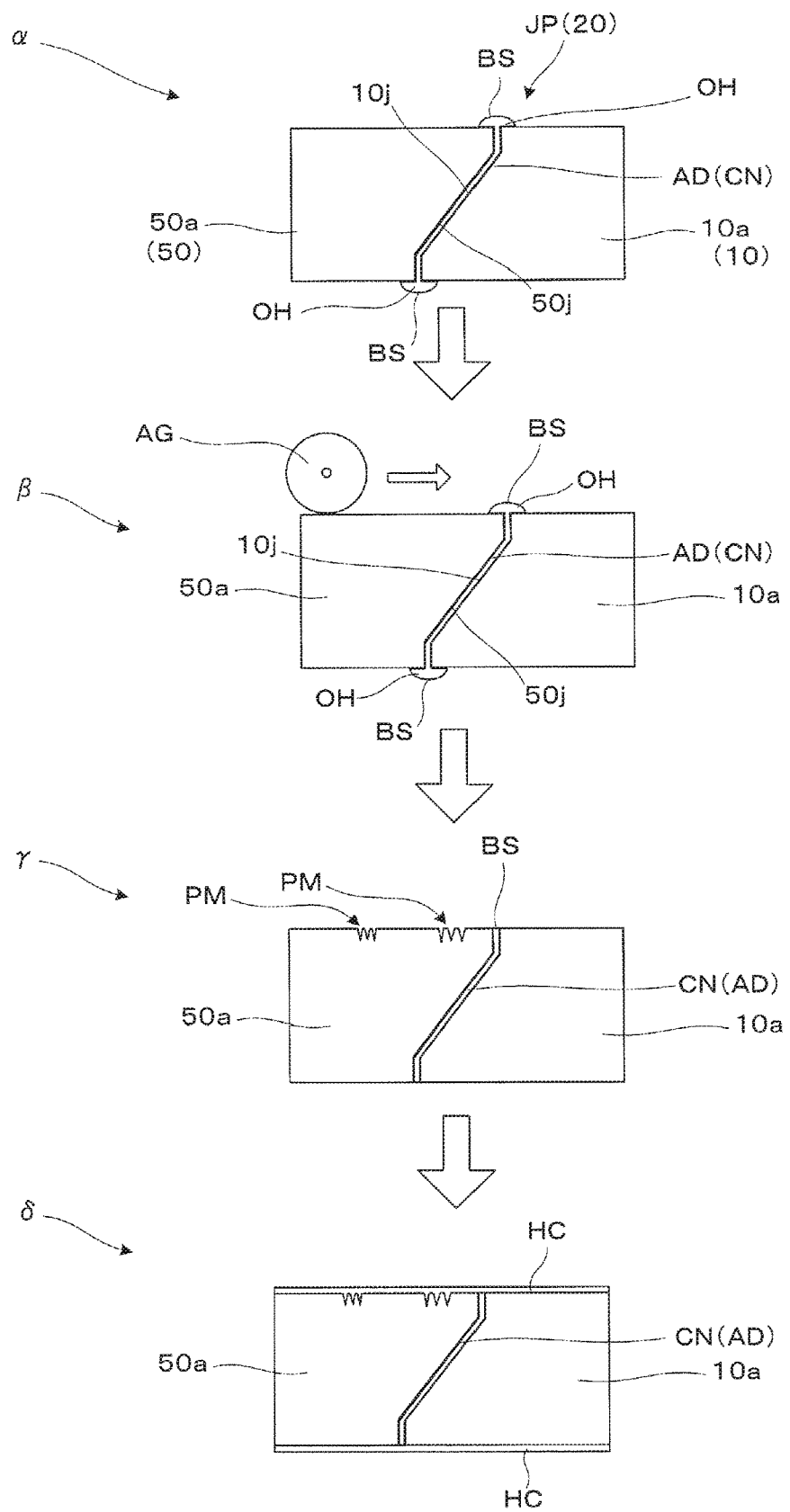
FIG. 3 is a view for illustrating an example of a production process for the bonded optical member.

Hereinafter, with reference to FIG. 2, an example of the structure or the like for guiding a video light by the light guiding device 20 including the light guiding member 10 in the virtual image display device 100 will be conceptually described. FIG. 2 is a view showing apart of the first display device 100A, in which the optical system portion is particularly extracted. The device for guiding a video light is the first display device 100A and the second display device 100B (see FIG. 1, etc.) as previously described, however, the first display device 100A and the second display device 100B are symmetrical with each other and have an equivalent structure, and therefore, only the first display device 100A will be described, and the description of the second display device 100B will be omitted. As shown in FIGS. 2 and 3, the first display device 100A includes an image display device 80 which forms a video light, a projection lens 30 for forming an image which is housed in a lens barrel section, and the light guiding device 20 (second optical member 101b) which guides a video light having passed through the image display device 80 and the projection lens 30. The light guiding device 20 is constituted by the light guiding member 10 for guiding a light and seeing therethrough, and a light transmitting member 50 for seeing therethrough.

As the image display device 80, a video element (image display element) constituted by, for example, a self-emitting element such as an organic EL can be used. Further, the image display device 80 may be configured to include, for example, a lighting device (not shown) which is a backlight emitting an illumination light onto the image display element or a driving control section (not shown) which controls the operation other than the image display element (video element) which is a transmission-type spatial light modulator.

The projection lens 30 is a projection optical system including, for example, a plurality of (for example, three) optical elements (lenses) aligned along a direction (optical axis direction or z direction) in which an incident-side optical axis AX extends, and these optical parts (optical elements or lenses) are housed and supported by the lens barrel section which is an optical part holding member. Although a detailed description will be omitted, the lens barrel section is housed and supported by the exterior member 105d (see FIG. 1). By constituting the optical element by, for example, an aspheric lens including both an aspheric surface which is non-axisymmetric (non-axisymmetric aspheric surface) and an aspheric surface which is axisymmetric (axisymmetric aspheric surface), an intermediate image corresponding to a display image can be formed inside the light guiding member 10 in cooperation with a part of the light guiding member 10 constituting the light guiding device 20. The projection lens 30 projects a video light formed by the image display device 80 to the light guiding device 20 so as to make the video light incident thereon.

The light guiding device 20 is constituted by the light guiding member 10 for guiding a light and seeing therethrough, and the light transmitting member 50 for seeing therethrough as previously described. Further, in the light guiding device 20, by providing a hard coat layer 27 which is a protective layer in a surface portion, the body member is covered and protected. Among these, the light guiding member 10 is a part of the prism-type light guiding device 20 and is an integral member, but can be regarded as separate bodies: a first light guiding section 11 on the light emitting side and a second light guiding section 12 on the light incident side. The light transmitting member 50 is a member (auxiliary optical block) for assisting the see-through function of the light guiding member 10, that is, a light transmitting section, and is fixed integrally with the light guiding member 10 to form one light guiding device 20. The light guiding device 20 is accurately positioned with respect to the projection lens 30 and fixed thereto by, for example, being screwed to the optical part holding member such as the lens barrel section.

The light guiding member 10 has first to fifth faces S11 to S15 as side faces with an optical function. Among these, the first face S11 and the fourth face S14 are continuously adjacent, and the third face S13 and the fifth face S15 are continuously adjacent. Further, the second face S12 is placed between the first face S11 and the third face S13. On the surface of the second face S12, a half mirror layer is provided concomitantly. This half mirror layer is a reflective film having light transmittance (that is, a semi-transmissive reflective film) and is formed by forming a metal reflective film or a dielectric multilayer film, and a reflectivity with respect to a video light is appropriately set.

The light transmitting member 50 is fixed integrally with the light guiding member 10 to form one light guiding device 20 as previously described and is a member (auxiliary optical block) for assisting the see-through function of the light guiding member 10. The light transmitting member 50 which is the light transmitting section has a first transmitting face S51, a second transmitting face S52, and a third transmitting face S53 as side faces with an optical function. The second transmitting face S52 is placed between the first transmitting face S51 and the third transmitting face S53. The first transmitting face S51 is located on a face extending from the first face S11 of the light guiding member 10, the second transmitting face S52 is a curved face bonded to and integrated with the second face S12, and the third transmitting face S53 is located on a face extending from the third face S13 of the light guiding member 10. In other words, the first face S11 and the first transmitting face S51 are adjacent, and similarly, the third face S13 and the third transmitting face S53 are adjacent, and each face forms a smooth face in a state of being positioned flush.

In the light guiding device 20, the light guiding member 10 is bonded to the light transmitting member 50 through an adhesive layer CC, and a portion constituted by the bonding faces 10j and 50j of the light guiding member 10 and the light transmitting member 50, and the adhesive layer CC is referred to as "bonding section CN".

Although the formation of the hard coat layer 27 will be described in detail later, here, as one example, base materials to become the light guiding member 10 and the light transmitting member 50 are bonded through the bonding section CN, and the bonded base materials are coated by a dip treatment (see FIG. 4). That is, the hard coat layer 27 of the light guiding member 10 is provided on the entire light guiding device 20 along with the light transmitting member 50 in a one-layer structure so as to change the film thickness depending on the film formation position.

A body member 10s in the light guiding member 10 is formed of a resin material showing high light transmittance in a visible region, and is molded by, for example, injecting a thermoplastics resin into a molding die, followed by solidification. As the material of the body member 10s, for example, a cycloolefin polymer or the like can be used. The same applies to the light transmitting member 50, and a body member 50s is formed of the same material as the body member 10s of the light guiding member 10. The hard coat layer 27 is formed as an outer layer surface by applying a coating liquid in a state where these body members 10s and 50s are bonded to perform film formation, and functions as a protective layer which suppresses a scratch or the like on a surface portion (particularly an exposed portion). The body member 10s corresponds to the below-mentioned first base material 10a, and the body member 50s corresponds to the below-mentioned second base material 50a.

Hereinafter, with reference to FIG. 2, an optical path of a video light (here, a video light GL) will be schematically described. The light guiding member 10 makes the video light GL incident from the projection lens 30, and also guides the video light GL toward the eyes of the observer by reflection or the like on the first to fifth faces S11 to S15. Specifically, the video light GL from the projection lens 30 is first incident on the fourth face S14, and is reflected on the fifth face S15, and is incident again on the fourth face S14 from the inside and is totally reflected, and is incident on the third face S13 and is totally reflected, and is incident on the first face S11 and is totally reflected. The video light GL totally reflected on the first face S11 is incident on the second face S12 and is partially reflected while partially transmitting through the half mirror layer provided on the second face S12, and is incident again on the first face S11 and passes therethrough. The video light GL passing through the first face S11 is incident on the eyes of the observer or a position equivalent thereto as a nearly parallel beam. That is, the observer observes an image by the video light as a virtual image.

The light guiding device 20 allows the observer to visually recognize a video light by the light guiding member 10 as described above, and also allows the observer to observe an external image with little distortion in cooperation of the light guiding member 10 with the light transmitting member 50. At this time, the third face S13 and the first face S11 are flat planes nearly parallel to each other (diopter scale: nearly 0), and therefore hardly cause an aberration or the like with respect to the external light. Similarly, the third transmitting face S53 and the first transmitting face S51 are flat planes nearly parallel to each other. Further, the third transmitting face S53 and the first face S11 are flat planes nearly parallel to each other, and therefore hardly cause an aberration or the like. Accordingly, the observer observes an external image with no distortion through the light transmitting member 50. The light guiding direction DD1 of the entire light beam of the video light GL in the light guiding member 10 is set to a direction in which the light guiding member 10 extends as shown in the drawing (or a direction in which the light guiding member 10 and the light transmitting member 50 are aligned in the light guiding device 20).

The configuration of the second display device 100B (see FIG. 1, etc.) is also the same as the configuration described above. According to this, images corresponding to the right and left eyes can be formed respectively.

As described above, in this embodiment, in the inside of the light guiding member 10, the video light from the image display device 80 is guided by the five reflections including at least two total reflections from the first face S11 to the fifth face S15 as previously described. According to this, both the display of the video light and the see-through for allowing the external light to be visually recognized can be achieved, and also the aberration of the video light GL can be corrected.

Further, among the above-mentioned respective optical faces, the faces S11, S13, and S14, excluding the second face S12 and the fifth face S15, and the faces of regions connecting these faces are formed by covering the surfaces of the outer forms formed by the body member 10s to become the light guiding member 10 with the hard coat layer 27 while maintaining the shape. In other words, with respect to the surface shape of each face of the light guiding member 10, the final surface shape is formed by a hard coat treatment, however, the subjective element which determines the shape is determined by the shape of the body member 10s to become the light guiding member 10. The hard coat layer 27 forms at least part of the plurality of optical faces of the light guiding member 10.

In order to maintain the entire surfaces of the regions which allow the external light to pass therethrough among the respective faces of the light guiding member 10 and the light transmitting member 50 constituting the light guiding device 20 in the virtual image display device 100 having a see-through structure as described above in a favorable see-through state, particularly, it is important that the faces, which are the surfaces of the light guiding member 10 and the light transmitting member 50 and allow the external light to pass therethrough, and the bonding surface of the bonding section CN (or the adhesive layer CC) connecting these faces are in a state of being positioned flush.

In this embodiment, in the production of the bonded optical member to become the light guiding device 20, when bonding the base material to become the light guiding member 10 and the base material to become the light transmitting member 50, the bonding surface which is the surface of the bonding region is smoothed. In particular, in this embodiment, smoothing is achieved by providing the hard coat layer 27 so as to forma smoothing film-formed face, and also before forming the smoothing film-formed face, a treatment of flattening the region including the bonding surface by polishing using an abrasive grain is performed as a smoothing assisting treatment. By doing this, the state where the adjacent faces among the faces, which are the surfaces of the light guiding member 10 and the light transmitting member 50 and allow the external light to pass therethrough, and the bonding surface of the bonding section CN connecting these faces are in a state of being positioned flush can be ensured, and a favorable see-through property is maintained.

Hereinafter, with reference to FIG. 3, an example of the production method for the bonded optical member which can be also utilized as the light guiding device 20 will be described. FIG. 3 particularly shows steps associated with the bonding of the first base material 10a which is the base material to become the light guiding member 10 and constitutes the bonded optical member JP and the second base material 50a which is the base material to become the light transmitting member 50 and constitutes the bonded optical member JP in the production process for the bonded optical member JP to become the light guiding device 20.

First, in the drawing, as shown in a step α, the first base material 10*a* and the second base material 50*a* are bonded while positioning the adjacent respective surfaces so as to be aligned flush (bonding step). At this time, for example, in order to sufficiently spread an adhesive AD on the entire bonding faces 10*j* and 50*j* of the base materials 10*a* and 50*a*, a sufficient amount of the adhesive AD is applied thereto, and an excess part of the adhesive AD protrudes from the bonding faces 10*j* and 50*j*. Therefore, as shown in the drawing, a protruding section OH which protrudes from the surfaces of the respective base materials 10*a* and 50*a* in a positioned state is formed. Here, when the adhesive AD is solidified to form the bonding section CN, also the protruding section OH is cured as it is (curing step). In this state, the protruding section OH forms the bonding surface BS.

Subsequently, as shown in a step β, a treatment of flattening the surface by polishing the surface layer using an abrasive grain AG is performed (a polishing step, a flattening step). In this case, as the surface of the protruding section OH which is the bonding surface BS is polished, for example, the surfaces of the first base material 10*a* and the second base material 50*a* adjacent to the bonding surface are also partially polished, and for example, a polished face as shown in the state γ is formed, and also the bonding surface BS becomes a part of the polished face. The polished face has a processing mark PM in some cases as shown in the drawing. That is, a range from the surface of the first base material 10*a* to the surface of the second base material 50*a* including the protruding section OH of the adhesive AD is polished, and a fine processing mark PM due to polishing is formed on the surface. However, in the drawing, in order to make the drawing easy to see, the processing mark PM is drawn largely and exaggeratedly, but the depth of a groove on the polished surface due to the processing mark PM is much smaller than, for example, the height or the like of the protruding section OH before polishing. That is, when regarding the processing mark PM as irregularities, the irregularities are very fine, small, and thin (the difference in height is small). In other words, by making the irregularities or the difference in steps small, the surface of a range from the first base material 10*a* to the second base material 50*a* including the bonding surface BS is brought into a state where the surface is easily aligned flush.

Subsequently, in a case where the processing mark PM as shown in the state γ is present on the polished face, the base materials 10*a* and 50*a* in a bonded state are coated by, for example, a dip treatment as shown in a step δ, whereby a hard coat layer HC (corresponding to the hard coat layer 27) is formed (a hard coating step). That is, a face functioning as the smoothing film-formed face is formed by the hard coat layer HC. In this case, as the hard coat layer HC is formed, the processing mark PM due to polishing is filled, whereby the surfaces of the base materials 10*a* and 50*a*, that is, the surface of the bonded optical member JP (corresponding to the light guiding device 20) is smoothed.

In the above description, the flattening treatment of the surface of the base material by polishing is a treatment to be performed before forming the face of the hard coat layer HC which is the smoothing film-formed face, and also is a treatment to be performed on the bonding surface BS or a region corresponding to the bonding surface BS, and can be regarded as the smoothing assisting treatment of assisting the smoothing by the formation of the hard coat.

Hereinafter, with reference to FIG. 4, etc., among the above-mentioned steps, a specific example of the film forming step for forming the hard coat layer 27 in the production of the light guiding device 20 is shown as one example corresponding to the hard coating step of forming the hard coat layer HC on the base materials 10*a* and 50*a* in a bonded state. Here, the step of dip treatment of forming the hard coat layer 27 by applying a coating liquid will be described as an example. FIG. 4 is a view showing the process of the production method and shows a state before forming the surface portion such as optical faces, however, for the sake of convenience of explanation, for example, the light guiding device 20, the hard coat layer 27, etc. are sometimes described as such instead of the base material to become the light guiding device 20 or the coating liquid to become the hard coat layer 27, etc.

Figure 4:
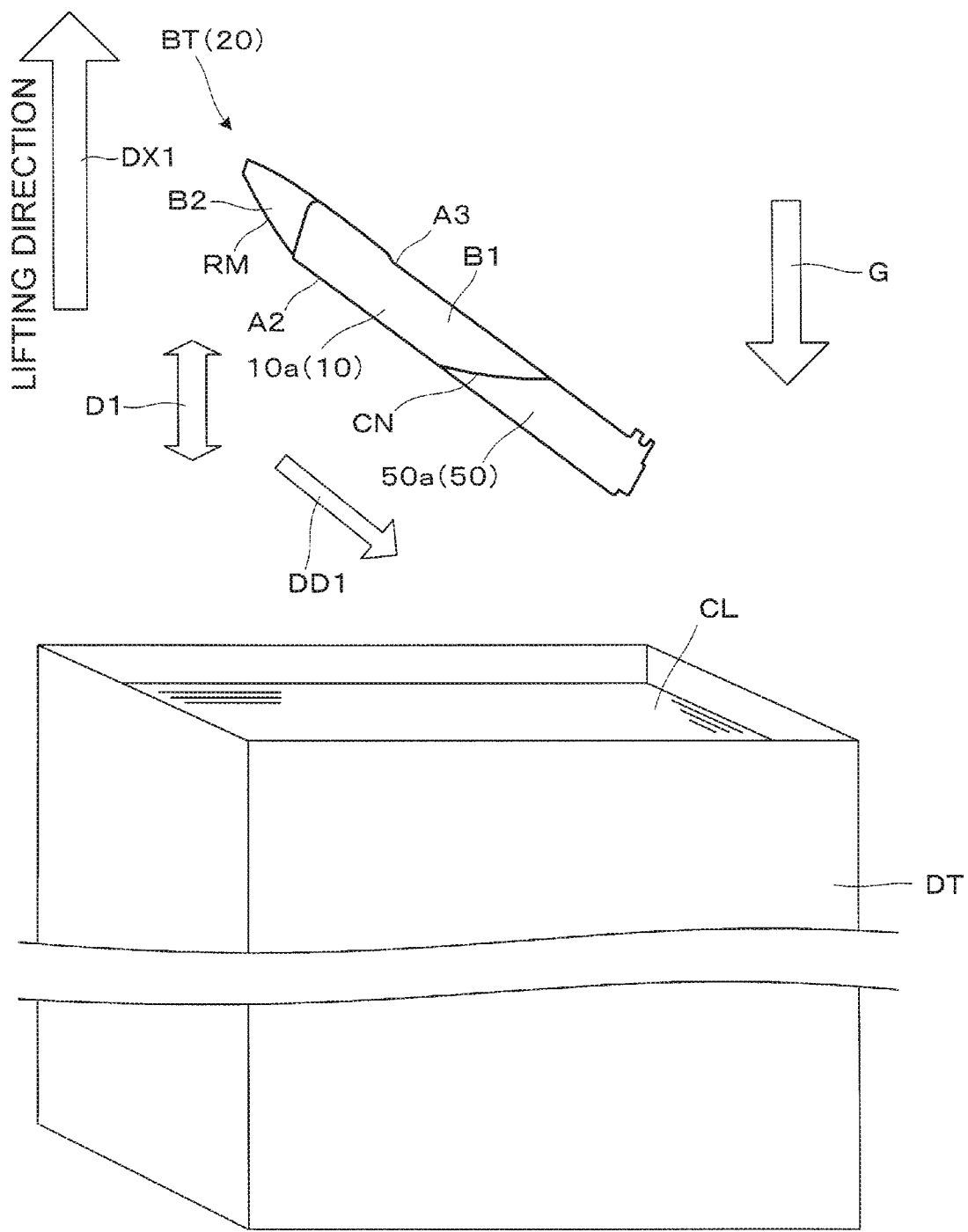
FIG. 4 is a view for showing a manner of a dip treatment for a hard coat.

In FIG. 4, a base material BT is a member to become the light guiding device 20 by forming the hard coat, and is a member in which the first base material 10*a* to become the light guiding member 10 and the second base material 50*a* to become the light transmitting member 50 are bonded through the bonding section CN. On the first base material 10*a*, a light reflective film corresponding to a light reflective film RM of the fifth face S15 is assumed to be formed as well. As shown in the drawing, this base material BT is fixed to, for example, a jig (not shown) at an attachment position present on the light incident side and is brought into a suspended state, and also a treatment tank DT filled with the coating liquid CL is prepared. The base material BT is in a suspended state by being fixed by the jig, and is moved vertically in the direction indicated by the arrow D1 (the direction along the gravity direction G), whereby the hard coat layer 27 is formed. In the both directions shown by the arrow D1, the direction which is the opposite direction to the gravity direction G is referred to as "direction DX1". The base material BT is first lowered in the gravity direction G with respect to the directions indicated by the arrow D1 and is brought into a state where it is dipped in the coating liquid CL contained in the treatment tank DT, and thereafter, is lifted in the lifting direction, that is, in the opposite direction to the gravity direction G and is brought into a state where the coating liquid CL is applied to the surface portion (coating liquid applying step).

The coating liquid CL applied to the surface of the base material BT by the above-mentioned coating liquid applying step covers the surface portion of the base material BT by flowing on the surface of the base material BT by gravity, the viscous force or the surface tension of the coating liquid CL, or the like, followed by drying of the coating liquid CL covering the surface, whereby the hard coat layer 27 is formed (film forming step).

In the example shown in the drawing, the light guiding direction DD1 of the light guiding device 20 is inclined with respect to the gravity direction G or the lifting direction DX1, however, the inclination may be adjusted according to the shape of the light guiding device 20, the necessary thickness of the hard coat layer 27, etc., and also the lifting speed may be adjusted.

As described above, in the production method for the bonded optical member JP according to this embodiment, smoothing is achieved by providing a face formed of the hard coat layer HC as the smoothing film-formed face on at least the adjacent surfaces in the bonding of the surfaces of the first base material 10*a* and the second base material 50*a* and on the bonding surface BS which is the surface of the bonding region connecting these materials, and at this time, the smoothing assisting treatment is performed by flattening the surfaces of the base materials by polishing on the bonding surface BS or a region corresponding to the bonding surface BS as a treatment before forming the hard coat layer HC. In this manner, sufficient smoothing can be achieved by the synergistic effect of smoothing by formation of the hard coat layer HC as the formation of the smoothing film-formed face and the flattening treatment by polishing as the smoothing assisting treatment, and the bonded optical member JP in which the surface of the bonding region between the first base material 10a and the second base material 50a is simply and reliably formed in a favorable state can be produced. Further, by using the bonded optical member JP as the light guiding device 20 constituting the virtual image display device 100, a see-through property in the bonding region can be made favorable.

Figure 5:
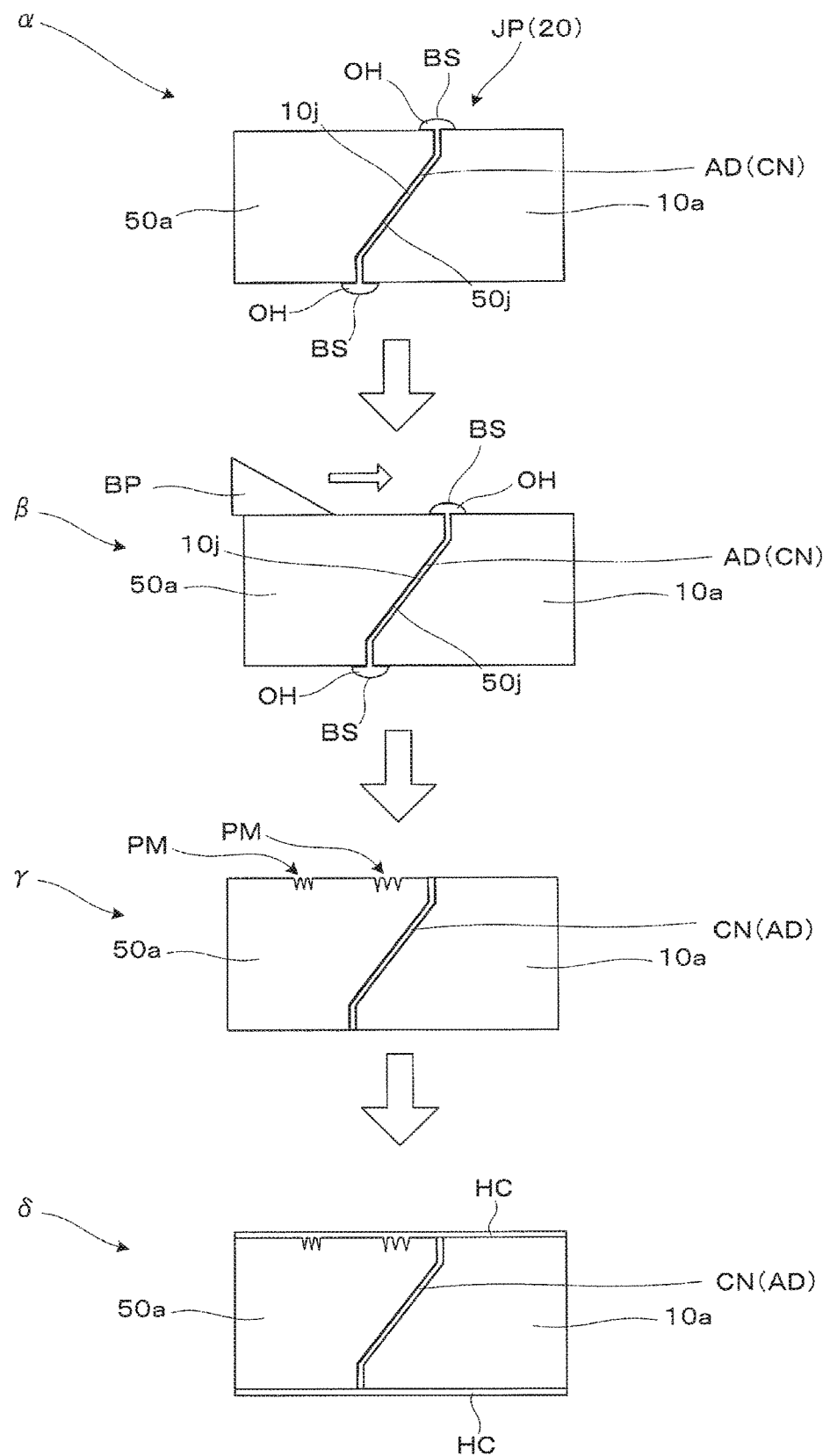
FIG. 5 is a view for illustrating another example of the production process for the bonded optical member.

FIG. 5 is a view for illustrating another example of the production process for the bonded optical member and corresponds to FIG. 3. In the example shown in FIG. 3, the surface is flattened by polishing the surface layer of the base material using an abrasive grain, however, the flattening method is not limited thereto, and for example, as shown in FIG. 5, the flattening may be achieved by polishing or shaving using a blade-shaped member BP. That is, first, as shown in a step α, the surface of the protruding section OH generated when bonding the first base material 10a and the second base material 50a is flattened by polishing or shaving using the blade-shaped member BP as shown in a step β. Also in this case, a processing mark PM as shown in a state γ may be formed on the polished face, however, as shown in a step δ, by forming the hard coat layer HC by, for example, a dip treatment, the processing mark PM is filled, so that the surfaces of the base materials, that is, the surface of the bonded optical member JP is flattened.

Second Embodiment

Figure 6:
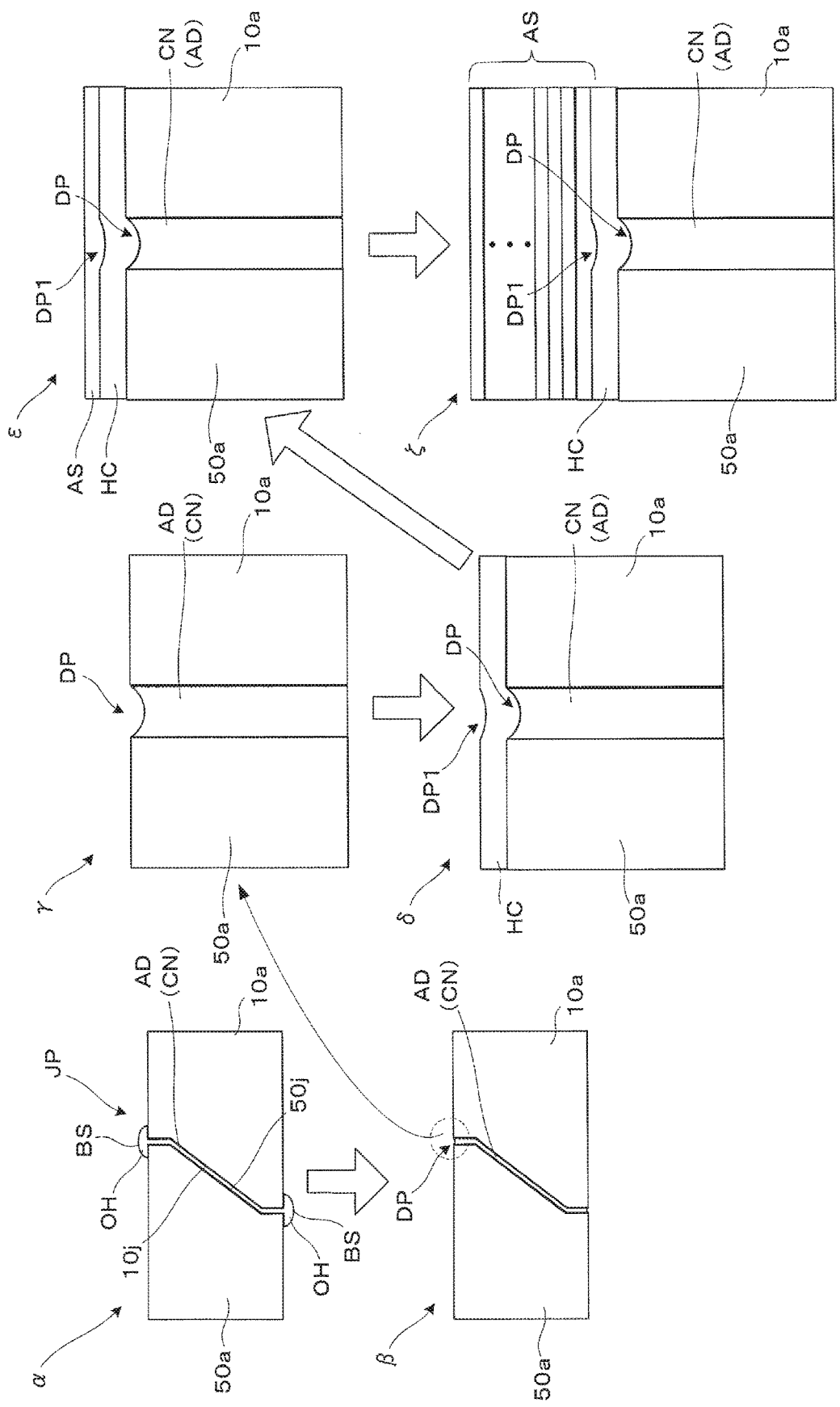
FIG. 6 is a view for illustrating an example of a production process for a bonded optical member according to a second embodiment.

Hereinafter, with reference to FIG. 6, a production method for a bonded optical member which can be applied as a light guiding device to be used in a head-mounted display device according to a second embodiment will be described. FIG. 6 is a view for illustrating an example of a production process for a bonded optical member according to this embodiment.

This embodiment is different from the first embodiment in that the bonded optical member JP in which the surface is smoothed is produced by performing a treatment of forming the assisting film-formed face by further performing film formation on the hard coat layer HC after forming the smoothing film-formed face of the hard coat layer HC instead of polishing using an abrasive grain or the like as the smoothing assisting treatment. In other words, in this embodiment, a multilayer film having a structure of two or more layers including the hard coat layer HC is formed on the base material, whereby smoothing is achieved by the synergistic effect thereof. That is, this embodiment and the first embodiment are common in that smoothing is achieved by forming the smoothing film-formed face of the hard coat layer HC, but are different in the smoothing assisting treatment.

Hereinafter, with reference to FIG. 6, the production process for the bonded optical member will be described. First, in the drawing, as shown in a step α, the first base material 10a and the second base material 50a are bonded while positioning the adjacent respective surfaces so as to be aligned flush (bonding step). At this time, a part of the adhesive AD protrudes from the bonding faces 10j and 50j, whereby the protruding section OH is formed.

Here, the removal of the protruding section OH shown in the step α is considered. As the removal method, the removal may be performed after solidification in the same manner as in the first embodiment, but it is also considered that for example, the protruding section OH is wiped off in an uncured state before it is solidified. In such a case, for example, as shown in a state β and a state γ which is a partially enlarged view thereof, a concavely recessed dent portion DP may be formed by excessively removing the adhesive AD.

Subsequently, as shown in a step δ, the hard coat layer HC is formed by coating the base materials 10a and 50a in a bonded state by, for example, a dip treatment (hard coating step). That is, a face functioning as the smoothing film-formed face is formed of the hard coat layer HC. In this case, when the dent portion DP is large, the dent portion DP cannot be sufficiently filled only by smoothing through the formation of the hard coat layer HC, and a slight dent portion DP1 may remain on the bonding surface BS or a region corresponding to the bonding surface BS.

In view of this, as shown in a step ε, after forming the smoothing film-formed face of the hard coat layer HC, film formation is further performed on the hard coat layer HC (first film-formed face), whereby an assisting film-formed face AS (second film-formed face) is formed. The assisting film-formed face AS is formed by, for example, performing coating with a desired film thickness through a dip treatment in the same manner as the film formation of the hard coat layer HC so as to fill the slight dent portion DP1, whereby achieving smoothing.

For the assisting film-formed face AS, it is necessary to use a material capable of further forming a film on the hard coat layer HC, and for example, it is considered to use a material having a different characteristic from that of the material applied to the hard coat layer HC. As such a material, it is considered to apply a material of an antireflective film or a material as a foundation layer of an antireflective film. Further, as shown in a step C, according to need, by further performing film formation many times, for example, the assisting film-formed face AS may be formed of an AR coat layer having a multilayer film structure in which a layer having a relatively high refractive index and a layer having a relatively low refractive index are alternately stacked. As described above, in order to achieve smoothing with the hard coat layer HC, by further forming the assisting film-formed face AS having a multilayer film structure including a face formed by a dip treatment, the surfaces of the base materials 10a and 50a, that is, the surface of the bonded optical member JP is smoothed.

In the above description, the treatment of forming the assisting film-formed face AS is a treatment performed after forming the smoothing film-formed face of the hard coat layer HC, and also is a treatment performed on the bonding surface BS or a region corresponding to the bonding surface BS, and therefore can be regarded as the smoothing assisting treatment of assisting the smoothing by film formation of the hard coat.

Further, in the above description, the assisting film-formed face AS is formed of the AR coat layer having a multilayer film structure, but it is not limited thereto, and the assisting film-formed face may be formed of, for example, a coat layer for cutting UV light or cutting blue light, or a second hard coat layer which is different from the hard coat layer HC forming the smoothing film-formed face, or the like.

Others

The invention has been described according to the embodiments, however, the invention is not limited to the above-mentioned embodiments and can be carried out in various embodiments without departing from the gist of the invention.

Figure 7:
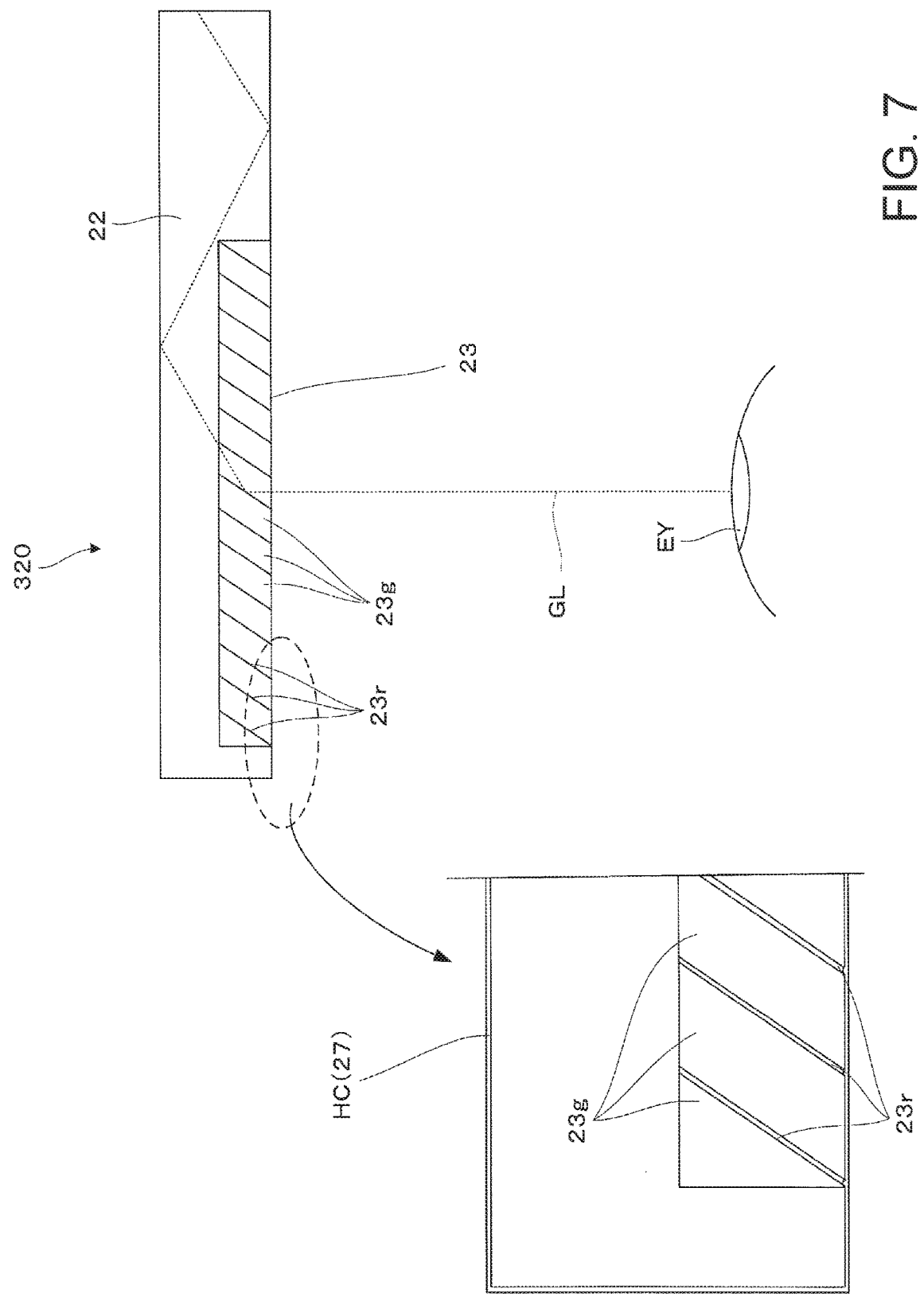
FIG. 7 is a view for illustrating another example of the light guiding device as the bonded optical member.

First, in the above-mentioned description, a case where two base materials are bonded has been described, however, the invention of this application is not limited thereto and may be applied to a case where three or more base materials are bonded. For example, as shown in FIG. 7, in a light guiding device 320 including a light guiding body section 22 which makes a video light incident and also guides the incident video light and an angle conversion section 23 which converts an angle with respect to the optical path of the video light incident on the light guiding body section 22, as the angle conversion section 23, an angle conversion section which includes many light transmitting members 23g having an inclined face is considered. In this case, particularly as shown in a partially enlarged view, the angle conversion section 23 is a plate-like member having many reflective faces 23r each in a state of being sandwiched between the respective members 23g. In such a case, the invention of this application can be applied, for example, when the many reflective faces 23r are bonded while being sandwiched between the many members 23g.

Further, in the above-mentioned description, the hard coat layer or the like is formed by a dip treatment, however, the smoothing film-formed face or the assisting film-formed face may be formed by spin coating, spraying, or the like as long as the formed film functions as the hard coat layer or the like, and film formation necessary for achieving smoothing is performed.

Further, in the above-mentioned description, in the film forming step by a dip treatment, film formation of the hard coat layer is performed by drying the coating liquid, however, film formation may be performed by another method, for example, UV curing or the like other than the method using drying.

Further, in the above-mentioned description, the hard coat layer is formed on the entire surface of the base material by a dip treatment, however, the hard coat layer is not necessarily formed on the entire surface. For example, a configuration in which among the respective faces S11, S13, and S14 which are side faces having an optical function, a face, which is not exposed because of being in, for example, a case, that is, the exterior member 105d, is not covered with the hard coat may be adopted. That is, in the formation of the smoothing film-formed face, it is only necessary to achieve smoothing by forming the hard coat layer on at least the surfaces of adjacent regions in the bonding of the surfaces of the first base material 10a and the second base material 50a as well as on the bonding surface BS connecting these base materials, and it is not always necessary to form the smoothing film-formed face on the entire surface. Of course, as described above with respect to the dip treatment, the smoothing film-formed face may be formed on the entire surface. The same applies to the range in which the smoothing assisting treatment is performed.

Figure 8:
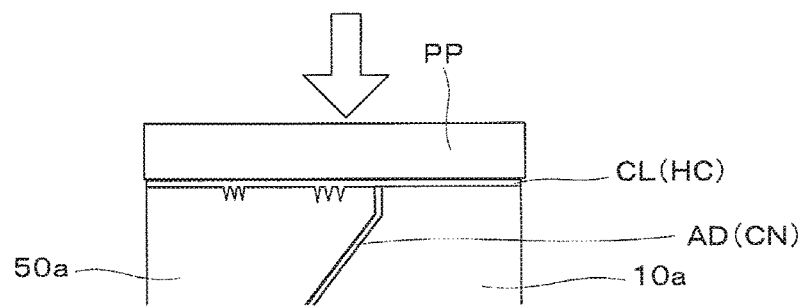
FIG. 8 is a view for illustrating still another example of the production process for the bonded optical member.

Further, for example, as shown in FIG. 8, when the first base material 10a and the second base material 50a are bonded by an adhesive, the bonded optical member JP may be produced by curing the adhesive while pressing the base materials using a pressing member PP constituted by, for example, a glass plate or the like. In this case, for example, the adhesive may be applied not only to the bonding face of the base materials 10a and 50a, but also to a face on the surface side.

Figure 9A:
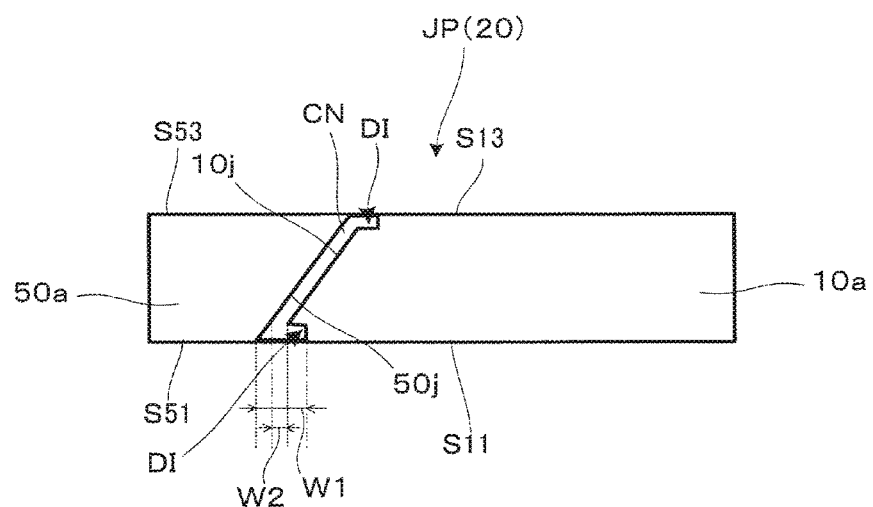
FIG. 9A is a view for conceptually showing still another example of the light guiding device as the bonded optical member.
Figure 9B:
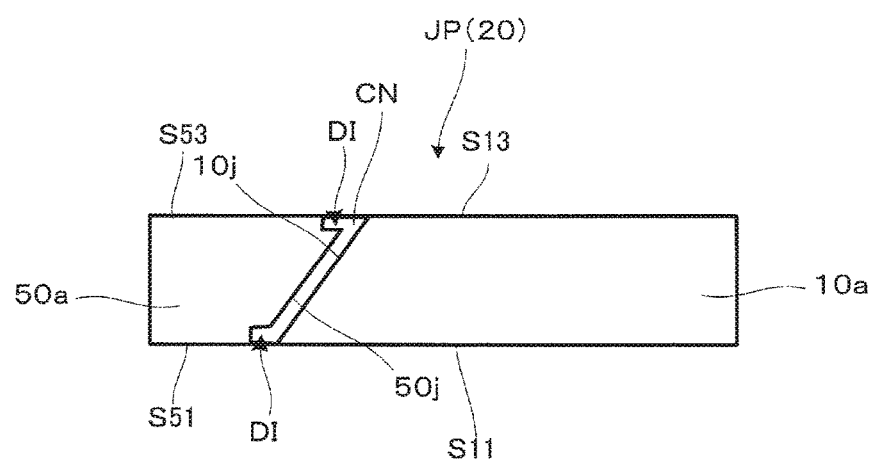
FIG. 9B is a view for conceptually showing still another example of the light guiding device as the bonded optical member.

Further, for example, as shown in FIG. 9A, a groove section DI which receives an adhesive may be provided in both or either one of the end portions on the side of the surfaces to become the faces S11 and S13 in the bonding face 10j of the first base material 10a to become the light guiding member 10. It is considered that by providing the groove portion DI in various shapes according to the type of the adhesive for forming the bonding section CN, the shape of the bonding face 10j, or the like, the adhesive can be prevented from being formed in a convex shape or the degree of the recessed portion of the adhesive section which is formed after wiping off the adhesive can be reduced. According to this, for example, when performing polishing as in the first embodiment, the shaving amount by polishing can be reduced, and in a case where a plurality of layers are formed and flattened as in the second embodiment, a dent portion to be formed can be made small. As shown in the drawing, it is considered that with respect to the shape or the like of the groove section DI, for example, as for the width of the bonding section CN in the bonding direction, the width W2 on the surface side is made larger than the usual width W1. Further, it is not limited to the bonding face 10j of the light guiding member 10, and for example, as shown in FIG. 9B, a similar groove section DI may be provided on the bonding face 50j of the second base material 50a. In a case where the groove section DI is provided on the face S13 on a side closer to the eye or on the face S51 side, it is considered that the view is out of focus and is hardly visually recognized.

Figure 10:
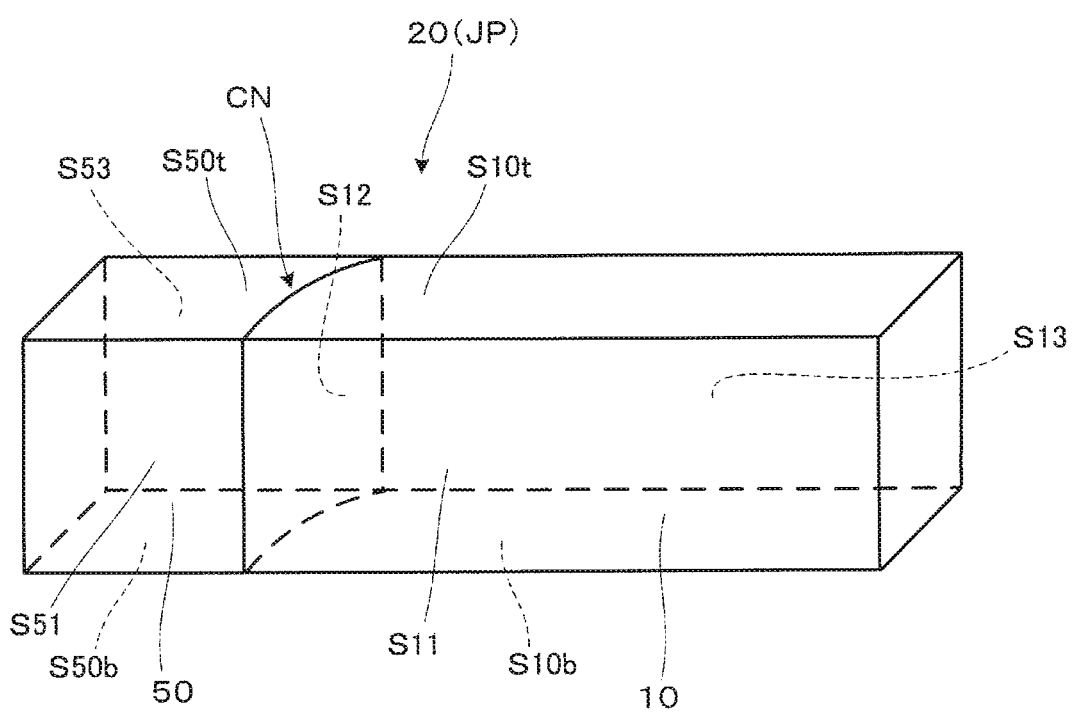
FIG. 10 is a perspective view for conceptually showing another example of the light guiding device as the bonded optical member.

Further, the smoothing treatment may be performed not only in the range from the face S11 to the face S51 which are adjacent to each other or the range from the face S13 to the face S531 described above, but also on faces which are regions other than these ranges and are adjacent to each other through the adhesive. For example, as the light guiding device 20 or the bonded optical member JP to become the light guiding device 20 conceptually shown in FIG. 10, the upper and the lower faces which do not contribute to the guiding of the video light of the light guiding member 10, that is, on the upper end face S10t which is the surface of the upper end portion or the lower end face S10b which is the surface of the lower end portion and the periphery thereof, it is considered to perform the same smoothing treatment as that performed for the face S11 or the like. Specifically, when the upper end face S50t and the lower end face S50b, which are the upper face and the lower face of the light transmitting member 50 to be adjacent to the upper end face S10t and the lower end face S10b of the light guiding member 10, respectively, are made adjacent through the adhesive, a range from the upper end face S10t to the upper end face S50t, or a range from the lower end face S10b to the lower end face S50b may be smoothed. In other words, in the light guiding device 20, also a face which is a side face to be formed between the faces S11 and S13 being a pair of total reflection faces and is located on the upper side or the lower side may be formed as a smooth face in a state of being positioned flush by smoothing together.

Further, in the above-mentioned embodiments, the light guiding device 20 is configured to cover the entire eyes of a wearer, but the configuration is not limited thereto, and for example, as an optical system of a pupil division system or the like using a light guiding optical system having a smaller injection opening than the size of the pupil, a small configuration in which the eyes are partially covered and an uncovering portion is present may be adopted. Further, it is also considered that the invention is applied to a device in which a hologram is placed on the light incident side or the light emitting side.

Further, in the above description, as the image display device 80, various types can be used, and for example, a configuration using a reflection-type liquid crystal display device can also be adopted, and also a digital micromirror device or the like can be used in place of a video display element composed of a liquid crystal display device or the like.

Further, in the above description, the half mirror layer of the second face S12 is formed of a metal reflective film or a dielectric multilayer film, but can be replaced with a flat or curved hologram element. Further, also the fifth face S15 is configured to be a mirror reflective face, and other than this, it can also be constituted by a hologram element.

In the above description, the light guiding member 10 or the like extends in the lateral direction in which the eyes are arranged, however, the light guiding member 10 may also be placed so as to extent in the vertical direction. In this case, the light guiding members 10 are configured to be arranged in parallel not in series but side by side.

Further, in the above description, a binocular virtual image display device including a pair of display devices has been described, however, the virtual image display device may be configured to include a single display device. That is, an image display device or the like is provided for only one eye either the right eye or the left eye, and the virtual image display device may be configured to view the image with one eye.

The entire disclosure of Japanese Patent Application No. 2017-049701, filed Mar. 15, 2017 is expressly incorporated by reference herein.

What is claimed is:

1. A production method for a bonded optical member in which a first base material and a second base material are bonded, comprising:
   bonding, with an adhesive, the first base material and the second base material by aligning a surface of the first base material to a surface of the second base material, such that, after bonding, the adhesive protrudes from and contacts the surface of the first base material and the surface of the second base material;
   forming a bonding surface by curing the adhesive;
   polishing the bonding surface and areas adjacent to the surface of the first base material and the surface of the second base material; and
   coating the bonding surface, the surface of the first base material, and the surface of the second base material with a hard coat layer to form a smoothing film-formed face that includes a surface that is totally reflective,
   wherein:
   the first base material constitutes a light guiding member which guides a video light,
   the second base material constitutes a light transmitting member which is provided so as to face the light guiding member and transmits an external light there through, and
   a reflective face which reflects the video light is formed on the bonding surface between the first base material and the second base material.

2. The production method for a bonded optical member according to claim 1, wherein the smoothing film-formed face is a face formed by a dip treatment.

3. A production method for a virtual image display device, which includes a bonded optical member produced by the production method for a bonded optical member according to claim 2 as a light guiding device.

4. The production method for a bonded optical member according to claim 1, further comprising performing a smoothing assisting treatment on the bonding surface or a region corresponding to the bonding surface, the smoothing assisting treatment being a treatment the forms an assisting film-formed face by further performing film formation on the smoothing film-formed face after forming the smoothing film-formed face.

5. The production method for a bonded optical member according to claim 4, wherein the assisting film-formed face includes a face formed by a dip treatment.

6. A production method for a virtual image display device, which includes a bonded optical member produced by the production method for a bonded optical member according to claim 5 as a light guiding device.

7. The production method for a bonded optical member according to claim 4, wherein the assisting film-formed face has a multilayer film structure in which a layer having a relatively high refractive index and a layer having a relatively low refractive index are alternately stacked.

8. A production method for a virtual image display device, which includes a bonded optical member produced by the production method for a bonded optical member according to claim 7 as a light guiding device.

9. A production method for a virtual image display device, which includes a bonded optical member produced by the production method for a bonded optical member according to claim 4 as a light guiding device.

10. The production method for a bonded optical member according to claim 1, further comprising performing a smoothing assisting treatment on the bonding surface or a region corresponding to the bonding surface, the smoothing assisting treatment being a treatment that flattens a surface portion including at least a region to become the bonding surface before forming the smoothing film-formed face.

11. The production method for a bonded optical member according to claim 10, wherein the smoothing assisting treatment is a flattening treatment by polishing using an abrasive grain or a blade-shaped member.

12. The production method for a bonded optical member according to claim 11, wherein the smoothing film-formed face is formed by filling a processing mark by polishing.

13. A production method for a virtual image display device, which includes a bonded optical member produced by the production method for a bonded optical member according to claim 1 as a light guiding device.

* * * * *